(12) United States Patent
Cai

(10) Patent No.: US 10,132,081 B2
(45) Date of Patent: Nov. 20, 2018

(54) HIGH ELONGATION RIDGE VENTILATION SHEET FOR SLOPING ROOF AND FABRICATING METHOD THEREFOR

(71) Applicant: Jian Cai, Shanghai (CN)

(72) Inventor: Jian Cai, Shanghai (CN)

( * ) Notice: Subject to any disclaimer, the term of this patent is extended or adjusted under 35 U.S.C. 154(b) by 12 days.

(21) Appl. No.: 15/626,034

(22) Filed: Jun. 16, 2017

(65) Prior Publication Data

US 2017/0284101 A1    Oct. 5, 2017

Related U.S. Application Data

(63) Continuation-in-part of application No. PCT/CN2015/091154, filed on Sep. 30, 2015.

(30) Foreign Application Priority Data

Dec. 22, 2014  (CN) .......................... 2014 1 0821560

(51) Int. Cl.
*B32B 5/02*   (2006.01)
*E04D 1/30*   (2006.01)
(Continued)

(52) U.S. Cl.
CPC .................. *E04D 1/30* (2013.01); *B32B 3/28* (2013.01); *B32B 5/022* (2013.01); *B32B 15/09* (2013.01); *B32B 15/20* (2013.01); *B32B 37/12* (2013.01); *E04D 3/18* (2013.01); *E04D 13/174* (2013.01); *B32B 2419/06* (2013.01); *Y10T 428/19* (2015.01); *Y10T 428/24331* (2015.01); *Y10T 428/24686* (2015.01)

(58) Field of Classification Search
CPC ........... Y10T 428/19; Y10T 428/24231; Y10T 428/24331; Y10T 428/24686; E04D 1/30; E04D 13/174; E04D 13/176; B32B 15/09; B32B 5/022; B32B 2419/06
See application file for complete search history.

(56) References Cited

FOREIGN PATENT DOCUMENTS

| CN | 1693624 A | 11/2005 |
|---|---|---|
| CN | 102041882 A | 5/2011 |

(Continued)

*Primary Examiner* — Alexander S Thomas
(74) *Attorney, Agent, or Firm* — Mei & Mark LLP; Manni Li

(57) ABSTRACT

A high elongation ridge ventilation sheet for a sloping roof, having a coated composite aluminum membrane with multiple circular holes, each side of the coated composite aluminum membrane being bonded respectively with a folded composite aluminum membrane via a butyl adhesive tape for central linking, on a side of each folded composite aluminum membrane adjacent the coated composite aluminum membrane is arranged with a hot melt adhesive for connecting a polyester nonwoven fabric with each folded composite aluminum membrane, with the polyester nonwoven fabric covering the whole coated composite aluminum membrane. Further, a fabricating method therefor that realizes wholly dry construction; ridge ventilation sheets adopted on ridge locations not only make the whole roof prettier, but more importantly, enable air convection under the roof in a true sense, taking out extra dampness and heat, resulting in better energy saving effects, and extending life span for the roof.

6 Claims, 1 Drawing Sheet

(51) Int. Cl.
  *B32B 15/09* (2006.01)
  *B32B 15/20* (2006.01)
  *B32B 37/12* (2006.01)
  *B32B 3/28* (2006.01)
  *E04D 3/18* (2006.01)
  *E04D 13/17* (2006.01)

(56) References Cited

FOREIGN PATENT DOCUMENTS

| | | | |
|---|---|---|---|
| CN | 102168474 A | 8/2011 | |
| CN | 102168474 B | 7/2012 | |
| JP | 2003056133 A | 2/2003 | |
| WO | WO-8402970 A1 * | 8/1984 | ........... E04D 13/174 |

* cited by examiner

HIGH ELONGATION RIDGE VENTILATION SHEET FOR SLOPING ROOF AND FABRICATING METHOD THEREFOR

CROSS-REFERENCE TO RELATED APPLICATIONS

The subject application is a continuation-in-part of PCT/CN2015/091154 filed on Sep. 30, 2015 and claims priority on Chinese application no. 201410821560.3 filed on Dec. 22, 2014. The contents and subject matter of the PCT and Chinese priority application are incorporated herein by reference.

TECHNICAL FIELD

The present invention relates to roof construction engineering and planted roof engineering, particularly, a high elongation ridge ventilation sheet for a sloping roof and a fabricating method therefor.

BACKGROUND OF INVENTION

Improved life standard has called for more attention on quality, functionality, and appearance of buildings. On the other hand, energy issues have engaged governments to request better energy saving effects for buildings.

Mortar construction in the current technology has the following defects: first, the roof is heavily loaded; second, the construction period is long, and construction is costly and time-consuming; third, the life span is short; fourth, the roof is tainted by mortar and difficult to clean; and fifth, repair is costly and difficult in case of leakage due to inability to find the cause.

In the past 5 years, new techniques in the sloping roof construction have been tried but invariably limited to using batten tiles for primary tiles and mortar construction for ridge tiles, which is commonly called semi-dry construction. The construction method results in an inability of damp air under the roof to discharge via the ridge portion due to the ridge being packed solidly with cement mortar, and thus, causes the batten tiles to decay quickly within a short life time for the roof. Further, the mortar constructed ridge tiles taint the primary tiles, are apt to loose and fall off, and thus, result in the leakage and economic loss.

SUMMARY OF THE INVENTION

To overcome the above defects, the present invention provides a high elongation ridge ventilation sheet for a sloping roof which adopts fully dry construction method with ridge ventilation sheets employed on ridge locations. The result is a roof with prettier appearance, and more importantly, with air circulating with convection in a true sense under the roof, taking out extra dampness and heat. The present invention results in better energy saving and longer life span for the roof with reduced roof load owing to the absence of the cement mortar.

The high elongation ridge ventilation sheet for a sloping roof of the present invention comprises two folded composite aluminum membranes, each folded composite aluminum membrane comprising three layers in a bottom up sequence of a PET polyester membrane, an aluminum foil, and a polyurethane; a coated composite aluminum membrane with multiple circular holes, the coated composite aluminum membrane comprising in a bottom up sequence of a polyurethane, an aluminum foil, and a PET polyester membrane; a butyl adhesive tape for central linking coated on a curved line of either side of the polyurethane layer of the coated composite aluminum membrane, the butyl adhesive tape for central linking being bonded with the PET polyester membrane of one of the folded composite aluminum membranes. On a surface of the polyurethane layer of each folded composite aluminum membrane adjacent the coated composite aluminum membrane, a hot melt adhesive for a polyester nonwoven fabric is arranged to connect with each of the folded composite aluminum membranes, with the polyester nonwoven fabric covering the whole coated composite aluminum membrane.

In the present invention, a side butyl adhesive tape having a separator paper is arranged on each side of a bottom of each folded composite aluminum membrane.

In the present invention, each side of the PET polyester membrane of the coated composite aluminum membrane forms a downward protruding bend with a bonding location of the butyl adhesive tape for central linking where the PET polyester membrane bonds with the butyl adhesive tape for central linking.

The present invention further provides a method for fabricating the high elongation ridge ventilation sheet for a sloping roof comprises the following steps:

(1) Fabricating the coated composite aluminum membrane;

(2) Bonding the folded composite aluminum membranes with the coated composite aluminum membrane via the butyl adhesive tapes for central linking to form an entity;

(3) Adhering the polyester nonwoven fabric with the hot melt adhesive on the surface of each folded composite aluminum membrane adjacent the coated composite aluminum membrane and covering the whole coated composite aluminum membrane with the polyester nonwoven fabric; and (4) Adhering the side butyl adhesive tape on the bottom of each folded composite aluminum membrane to complete fabrication of the ridge ventilation sheet.

Step (1) for fabricating the coated composite aluminum membrane of the method for fabricating the high elongation ridge ventilation sheet for a sloping roof further comprises the following steps:

(i) Compounding an aluminum foil with the PET polyester membrane at high temperature;

(ii) Conducting high weatherability coating on a surface of the aluminum foil;

(iii) Conducting mechanical drilling subsequent to cutting as is needed.

Step (3) of the method for fabricating the high elongation ridge ventilation sheet for a sloping roof further comprises a step of printing an installation center line on a middle of the polyester nonwoven fabric for installation and positioning, prior to adhering the polyester nonwoven fabric with the folded composite aluminum membrane.

In comparison with prior art, the present invention is advantageous in the following aspects:

1. A product with any width may be obtained by simply changing the width of the folded composite aluminum membrane without adjusting the original fabricating process. Thus, it meets the requirements of tiles in various forms and materials, and becomes a versatile ridge ventilation sheet for a sloping roof.

2. The existing sloping roof construction is transformed to a wholly dry process by the present invention. While ridge ventilation sheets adopted on ridge locations not only make the whole roof prettier, but also, and more importantly, enable air convection under the roof in a true sense and take out extra dampness and heat. The present invention results in better energy saving and extended life span for the roof.

3. Absence of cement mortar reduces the roof load.

DETAILED DESCRIPTION OF INVENTION AND EMBODIMENTS

The present invention is illustrated in details in the figures and following embodiment. The embodiment is implemented based on the present invention but is not meant to limit the scope of the present invention.

Figure 1:
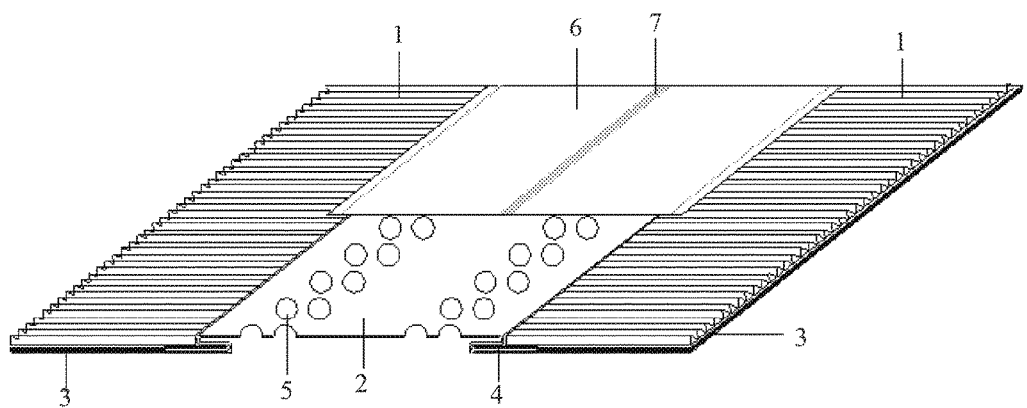
FIG. 1 is a schematic diagram showing the high elongation ridge ventilation sheet for a sloping roof of the present invention.

As shown in FIG. 1, a high elongation ridge ventilation sheet for a sloping roof has a coated composite aluminum membrane 2 with multiple circular holes 5, each side of the coated composite aluminum membrane 2 is bonded with a folded composite aluminum membrane 1 via a butyl adhesive tape for central linking 4 and forms a downward protruding bend. A hot melt adhesive for a polyester nonwoven fabric 6 is arranged on the surface of the polyurethane layer of each folded composite aluminum membrane 1 adjacent the coated composite aluminum membrane 2 for connecting to each folded composite aluminum membrane 1, and the polyester nonwoven fabric 6 covers the whole coated composite aluminum membrane 2. A side butyl adhesive tape 3 having a separator paper is arranged on each side of a bottom of each folded composite aluminum membrane 1. The coated composite aluminum membrane 2 comprises in a top down sequence of a layer with high weatherability surface, an aluminum foil, and a PET polyester membrane.

Figure 2:
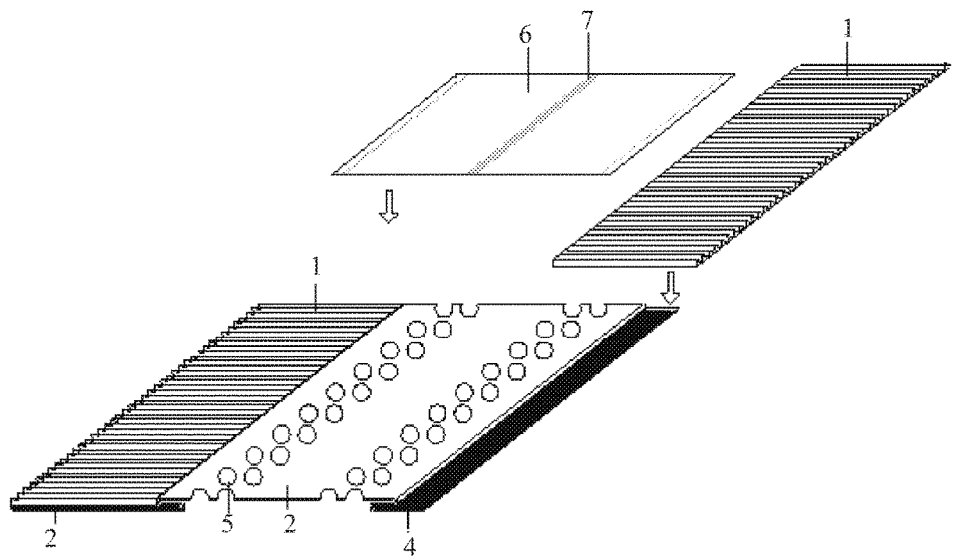
FIG. 2 is a schematic diagram showing installation and disassembly for the present invention.

As shown in FIG. 2, the method for fabricating the high elongation ridge ventilation sheet for a sloping roof comprises the following steps:
  (1) Fabricating the coated composite aluminum membrane 2 as follows:
    (i) Compounding an aluminum foil with the PET polyester membrane at a high temperature;
    (ii) Conducting high weatherability coating on the surface of the aluminum foil;
    (iii) Mechanical drilling multiple circular holes 5 subsequent to cutting as needed to allow air permeability.
  (2) Bonding the folded composite aluminum membranes 1 with the coated composite aluminum membrane 2 via the butyl adhesive tape for central linking 4 to form an entity;
  (3) Printing an installation center line 7 on the middle of the polyester nonwoven fabric 6;
  (4) Adhering the polyester nonwoven fabric 6 with the hot melt adhesive on the surface of each folded composite aluminum membrane 1 adjacent the coated composite aluminum membrane 2 and covering the whole coated composite aluminum membrane 2 with the polyester nonwoven fabric 6; and
  (5) Adhering the side butyl adhesive tape 3 on the bottom of each folded composite aluminum membrane 1 to complete fabrication of the ridge ventilation sheet.

Refer to Chinese Patent No. ZL201010614206.5 for making side folded composite aluminum membrane, and the reference is incorporated herein by reference. As shown in ZL201010614206.5, it achieves side extensibility rate of as high as 40% for the side fan-shaped folded extension. Thus, the present invention is capable of effectively fitting tiles of all types, while the widened butyl adhesive edges is capable of sticking with surfaces of tiles. Further, the width of the folded extension on either side in the present invention may be adjusted for special tiles to accommodate them, thus, the present invention provides a versatile ridge ventilation sheet.

I claim:

1. A high elongation ridge ventilation sheet for a sloping roof, comprising
    two folded composite aluminum membranes, each of the folded composite aluminum membranes comprising three layers in a bottom up sequence of a PET polyester membrane, an aluminum foil, and a polyurethane layer,
    a coated composite aluminum membrane, the coated composite aluminum membrane having multiple circular holes and comprising in a bottom up sequence of a polyurethane layer, an aluminum foil, and a PET polyester membrane,
    a butyl adhesive tape for central linking being coated on a curved line of a side of the polyurethane layer of the coated composite aluminum membrane, the butyl adhesive tape being bonded with the PET polyester membrane of the folded composite aluminum membranes,
    a polyester nonwoven fabric covering the whole coated composite aluminum membrane, and
    a hot melt adhesive being arranged on a surface of the polyurethane layer of each of the folded composite aluminum membrane adjacent to the coated composite aluminum membrane for connecting the polyester nonwoven fabric with each of the folded composite aluminum membranes.

2. The high elongation ridge ventilation sheet for a sloping roof of claim 1, wherein a side butyl adhesive tape having a separator paper is arranged on each side of a bottom of each folded composite aluminum membrane.

3. The high elongation ridge ventilation sheet for a sloping roof of claim 1, wherein each side of the PET polyester membrane of the coated composite aluminum membrane forms a downward protruding bend with a bonding location of the butyl adhesive tape for central linking where the PET polyester membrane bonds with the butyl adhesive tape for central linking.

4. A method for fabricating the high elongation ridge ventilation sheet for a sloping roof of claim 1, comprising
    fabricating the coated composite aluminum membrane,
    bonding the folded composite aluminum membranes with the coated composite aluminum membrane via the butyl adhesive tapes for central linking to form an entity;
    adhering the polyester nonwoven fabric with the hot melt adhesive on the surface of each folded composite aluminum membrane adjacent to the coated composite aluminum membrane and covering the whole coated composite aluminum membrane with the polyester nonwoven fabric; and
    adhering the side butyl adhesive tape on the bottom of each folded composite aluminum membrane to complete fabrication of the ridge ventilation sheet.

5. The method for fabricating the high elongation ridge ventilation sheet for a sloping roof of claim 4, wherein the coated composite aluminum membrane is fabricated by
    compounding an aluminum foil with the PET polyester membrane at high temperature;

conducting high weatherability coating on a surface of the aluminum foil; and conducting mechanical drilling subsequent to cutting as is needed.

6. The method for fabricating the high elongation ridge ventilation sheet for a sloping roof of claim 4, further comprising printing an installation center line on a middle of the polyester nonwoven fabric prior to adhering the folded composite aluminum membrane with the polyester nonwoven fabric.

\* \* \* \* \*